(12) United States Patent
Kollmitzer et al.

(10) Patent No.: US 10,606,794 B1
(45) Date of Patent: Mar. 31, 2020

(54) CLOCK SIGNAL MONITOR FOR SLAVE DEVICE ON A MASTER-SLAVE BUS

(71) Applicant: Infineon Technologies AG, Neubiberg (DE)

(72) Inventors: Benjamin Kollmitzer, Graz (AT); Filippo Grillotti, Villach (AT); Richard Heinz, Munich (DE); Stephan Leisenheimer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/412,055

(22) Filed: May 14, 2019

(51) Int. Cl.
*G06F 13/00* (2006.01)
*G06F 13/42* (2006.01)

(52) U.S. Cl.
CPC ...... *G06F 13/4291* (2013.01); *G06F 13/4295* (2013.01)

(58) Field of Classification Search
CPC .......... G01R 31/3177; G01R 31/31705; G01R 31/31724; G06F 9/30014; G06F 9/30029; G06F 9/30032; G06F 9/30036
USPC ........................................................... 710/5
See application file for complete search history.

(56) References Cited

U.S. PATENT DOCUMENTS

| | | | |
|---|---|---|---|
| 3,461,237 A * | 8/1969 | Salter | H04L 25/4902 375/286 |
| 4,354,229 A | 10/1982 | Davis et al. | |
| 4,368,514 A | 1/1983 | Persaud et al. | |
| 5,452,308 A * | 9/1995 | Kaminski | H04L 41/06 710/100 |
| 6,675,243 B1 | 1/2004 | Bastiani et al. | |
| 2001/0023468 A1 * | 9/2001 | Oh | G06F 13/4291 710/305 |
| 2002/0133662 A1 * | 9/2002 | Cheung | G06F 13/385 710/310 |
| 2002/0163932 A1 * | 11/2002 | Fischer | H04L 1/0003 370/465 |
| 2006/0242348 A1 | 10/2006 | Humphrey et al. | |
| 2009/0024776 A1 * | 1/2009 | Cheung | G06F 13/385 710/110 |
| 2009/0091422 A1 * | 4/2009 | Minoo | G06F 13/4282 340/5.8 |
| 2015/0035565 A1 * | 2/2015 | Koyasu | H03K 5/1252 327/103 |
| 2017/0255250 A1 | 9/2017 | Ngo et al. | |

FOREIGN PATENT DOCUMENTS

| | | |
|---|---|---|
| GB | 2001462 A | 1/1979 |
| GB | 2402773 A | 12/2004 |
| JP | 2015216659 A | 12/2015 |

* cited by examiner

*Primary Examiner* — Titus Wong
(74) *Attorney, Agent, or Firm* — Harrity & Harrity, LLP

(57) ABSTRACT

A slave device may receive a clock signal from a master device via a bus. The slave device may detect a first pulse of the clock signal. The first pulse indicates that a bit is to be written to a slave shift register of the slave device. The slave device may identify a timeout threshold associated with the clock signal. The slave device may determine that the timeout threshold expired without a second pulse from the clock signal being detected. The slave device may reset, based on the timeout threshold expiring, the slave shift register to synchronize the slave shift register with a master shift register of the master device.

20 Claims, 9 Drawing Sheets

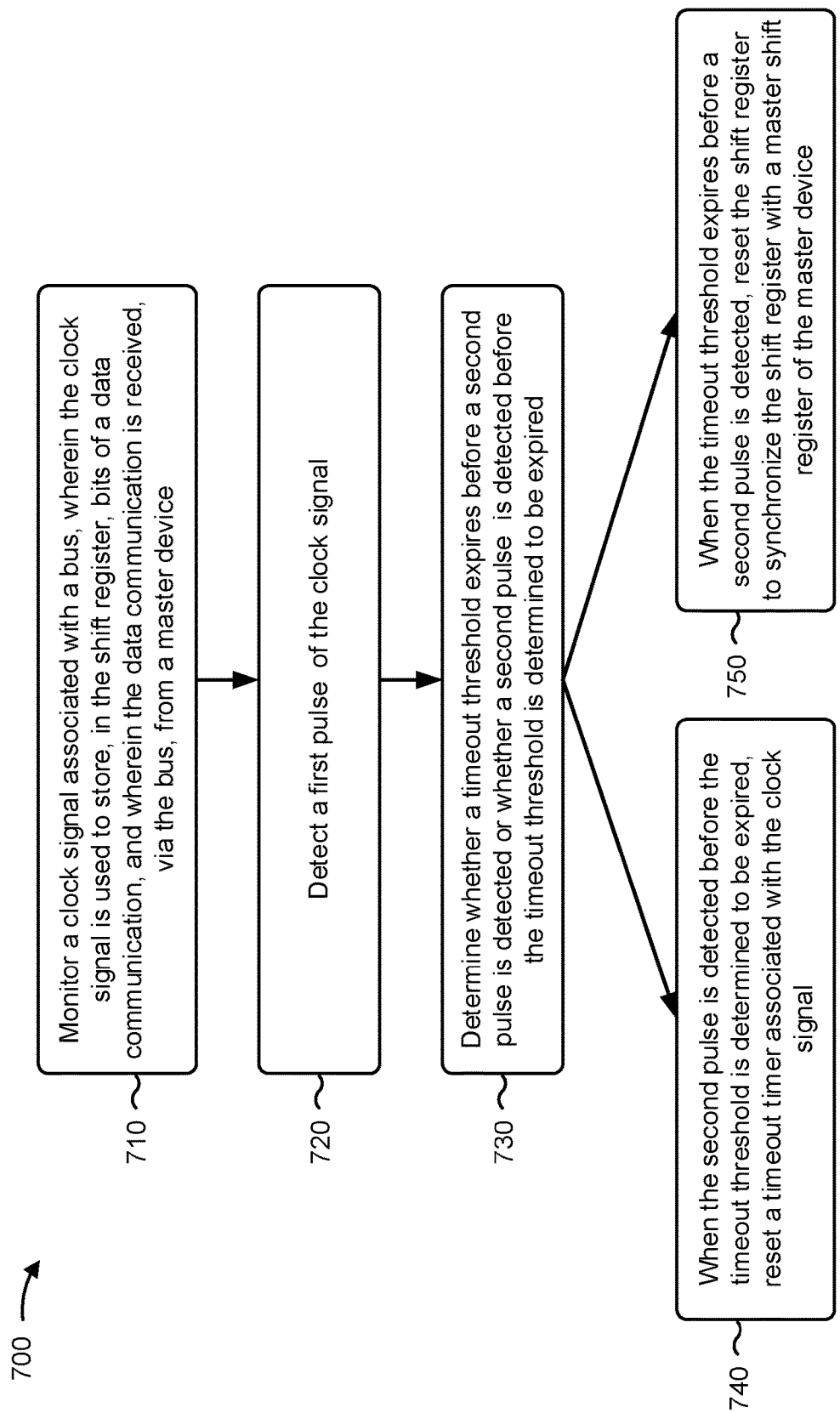

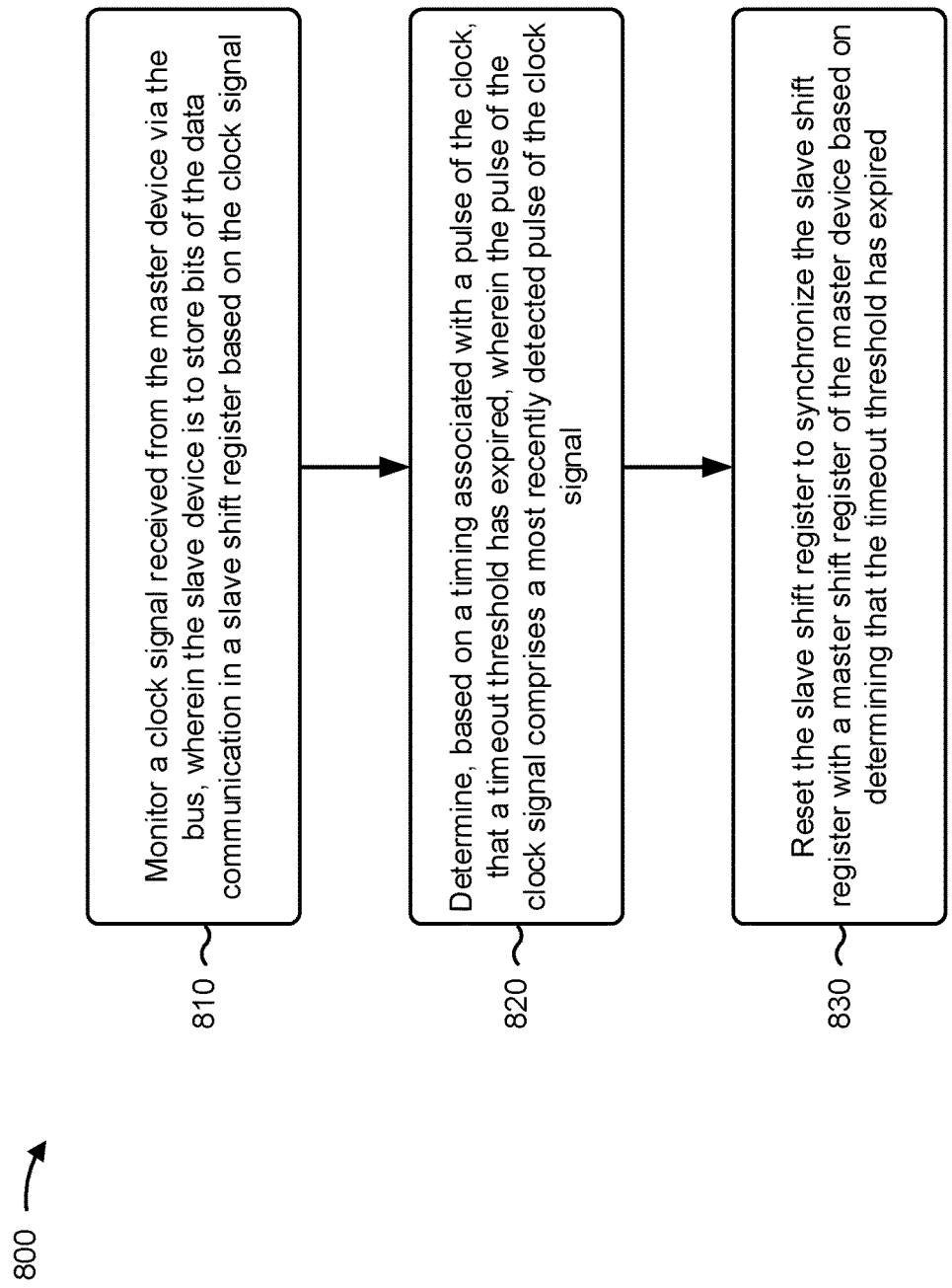

CLOCK SIGNAL MONITOR FOR SLAVE DEVICE ON A MASTER-SLAVE BUS

BACKGROUND

In a master-slave communication bus protocol, a master device has unidirectional control over one or more slave devices via a bus. The master device and the slave device(s) on the bus are to be synchronous according to a clock signal for sending or receiving data along the bus. Typically, the master device supplies, to the slave devices, the clock signal for data transmissions via the bus.

SUMMARY

According to some implementations, a method may include receiving a clock signal, wherein the clock signal is received from a master device via a bus; detecting a first pulse of the clock signal, wherein the first pulse indicates that a bit is to be written to or written from a slave shift register of the slave device; identifying a timeout threshold associated with the clock signal; determining that the timeout threshold expired without a second pulse from the clock signal being detected; and resetting, based on the timeout threshold expiring, the slave shift register to synchronize the slave shift register with a master shift register of the master device.

According to some implementations, a device may include one or more memories; and one or more processors, communicatively coupled to the one or more memories, configured to: a shift register; and a timeout monitor, communicatively coupled to the shift register, configured to: monitor a clock signal associated with a bus, wherein the clock signal is used to store, in the shift register, bits of a data communication, wherein the data communication is received, via the bus, from a master device; detect a first pulse of the clock signal; determine whether a timeout threshold expires before a second pulse is detected or whether a second pulse is detected before the timeout threshold is determined to be expired; and when the second pulse is detected before the timeout threshold is determined to be expired, reset a timeout timer associated with the clock signal, or when the timeout threshold expires before a second pulse is detected, reset the shift register to synchronize the shift register with a master shift register of the master device.

According to some implementations, a system may include a bus, a master device configured to transmit a data communication via the bus, and a slave device configured to monitor a clock signal received from the master device via the bus, wherein the slave device is to store bits of the data communication in a slave shift register based on the clock signal; determine, based on a timing associated with a pulse of the clock and the slave shift register including an empty slot, that a timeout threshold has expired, wherein the pulse of the clock signal comprises a most recently detected pulse of the clock signal; and reset the slave shift register to synchronize the slave shift register with a master shift register of the master device based on determining that the timeout threshold has expired.

BRIEF DESCRIPTION OF THE DRAWINGS

FIGS. 6-8 are flowcharts of example processes associated with a clock signal monitor for a slave device on a master-slave communication bus.

DETAILED DESCRIPTION

Figure 1A:
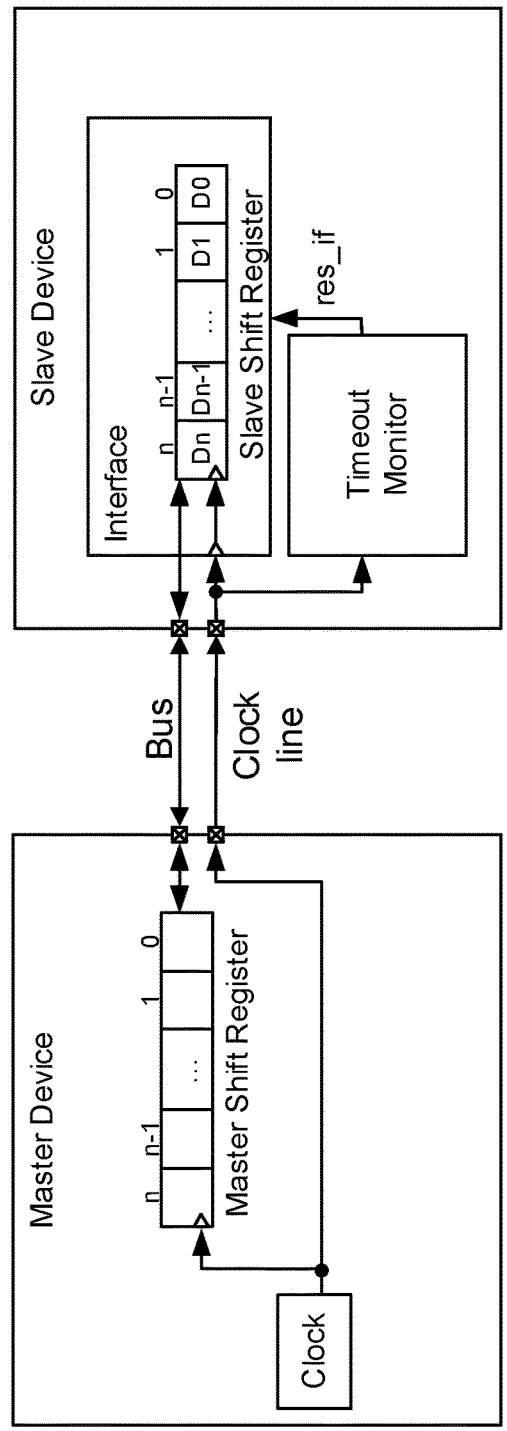
FIGS. 1A, 1B, 2, and 3 are diagrams of one or more example implementations described herein.

The following detailed description of example implementations refers to the accompanying drawings. The same reference numbers in different drawings may identify the same or similar elements.

In some instances, for digital interfaces between a master device and one or more slave devices, all devices on a master-slave bus are synchronized with respect to a clock signal used for communication via the bus. However, if a device on the bus becomes unsynchronized with the clock signal for the bus (e.g., due to a glitch in the clock signal, interference, and/or the like), means to resynchronize that device must exist to enable proper communication with the device. Such means to resynchronize may be different depending on the type of communication protocol used on the bus (and/or the type of devices that are communicating via the bus). For example, a slave device that utilizes an inter-integrated circuit (I2C) communication protocol (referred to herein as an "I2C device") may utilize a start and stop capability to withdraw the slave device from data transmissions and enable the slave device to be resynchronized. As another example, a slave device that utilizes a serial peripheral interface (SPI) communication protocol (referred to herein as an "SPI device") may use a dedicated chip select (CS) wire for resynchronization. While an I2C device may use fewer links to communicate via a master-slave bus (e.g., two wires) than an SPI device (e.g., more than two wires), communication speeds of the I2C device are relatively slower (e.g., less than 4 megabytes per second (Mbps)) than the SPI device, which can achieve communication speeds of approximately 10 Mbps. Furthermore, an SPI device may use relatively simpler hardware (e.g., simpler circuitry) than an I2C device. Accordingly, the SPI device may be desired over the I2C device for higher speed communications. However, in previous techniques, use of an SPI device as a slave device may be limited due to one of the communication links needing to be used as the CS wire to synchronize the SPI device.

According to some implementations described herein, a slave device may monitor a clock signal for a timeout associated with the clock signal. The timeout may indicate that the slave device is to be resynchronized with the master device (or with a clock signal provided by the master device). For example, the timeout may correspond to a timeout threshold (e.g., a threshold length of a time period) expiring without detecting a subsequent pulse (or clock cycle) of the clock signal after an initial pulse is detected. Accordingly, if the timeout expires without a shift register of the slave device being filled and/or without an identified word length of a data communication matching the number of bits in the shift register, the slave device may determine that an error associated with the clock signal occurred (or likely occurred) and/or that the slave device is to be resynchronized with a master device.

In some implementations, the slave device may include a timeout monitor (e.g., a component that includes a retriggerable monostable multivibrator (RMM), a counter, a timer, and/or the like) that detects a pulse and tracks an amount of time that passes since the pulse. If the amount of time that passes since the pulse is equal to or greater than the timeout threshold, the timeout monitor may detect the timeout associated with the clock signal and cause the slave device to be resynchronized. As described herein, the slave device may be resynchronized by resetting the shift register of the slave device. The slave device may reset the shift register by clearing any or all bits from the shift register. Accordingly, at the completion of a data communication from the master device and the detection of the timeout following receipt of the last bit of the data communication, both the slave device and the master device may include a cleared shift register and, thus, be synchronized.

Furthermore, while the bus is idle (e.g., while data is not being communicated across the bus), in the event that a clock pulse is erroneously detected (e.g., due to a glitch in the clock signal, due to interference, and/or the like) and a corresponding bit is erroneously added to the shift register, the slave device may clear the shift register because a timeout may be detected due to the bus being idle (e.g., because another clock pulse would not be detected while the bus is idle). Accordingly, if the slave device falsely detects a pulse in the clock signal while data communication is idle, the slave device may self-trigger a resynchronization process after another pulse is not received following a duration corresponding to the timeout threshold. In this way, the slave device may perform a resynchronization process that is self-triggered based on monitoring a clock signal for a timeout.

In some implementations, the slave device may use an SPI communication protocol. Accordingly, as described herein, the slave device may achieve relatively high communication speeds. Furthermore, because the slave device performs a self-triggered resynchronization process, the slave device can be resynchronized with a master device without utilizing a dedicated CS wire for resynchronization of the slave device (e.g., because the slave device performs a resynchronization process based on detecting a timeout associated with the clock signal). In this way, the slave device, configured to use SPI communication protocol, can be more efficiently used by enabling a communication link of the slave device, that would otherwise be used as a CS wire in previous techniques, to be available for one or more other implementations other than resynchronizing the slave device. Accordingly, a slave device that utilizes SPI communication protocol may be configured to not include (or need) a CS wire and still be capable of serving as a slave device for master-slave communication via a bus. Moreover hardware resources, such as conductive material (e.g., a metal wire, a metal trace, and/or the like) that would otherwise be used in previous techniques to form a CS wire connection between a master device and a slave device, can be conserved.

Figure 1B:
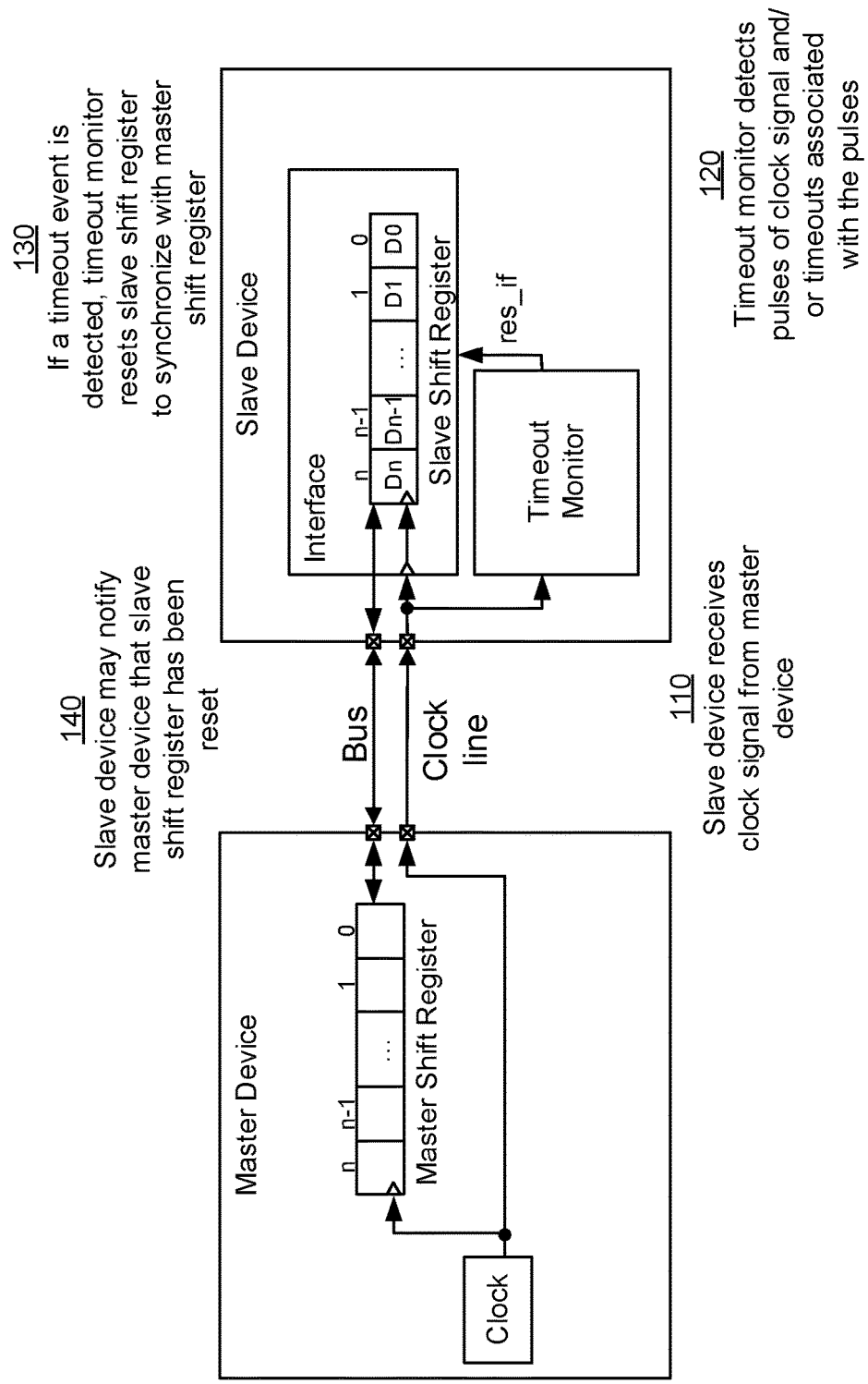

FIGS. 1A and 1B are diagrams of an example implementation 100 described herein. As shown in FIG. 1A, example implementation 100 includes a master device and a slave device communicatively coupled via a bus and a clock line (or wire). The bus may include one or more transmit wires and/or receive wires to permit data communications between the master device and the slave device. As further shown in FIG. 1A, the master device includes a clock and a master shift register, and the slave device includes a timeout monitor and an interface with a slave shift register.

The timeout monitor may include an RMM, a counter, a timer, and/or the like. As described herein, the timeout monitor monitors the clock signal and triggers the slave device to perform a resynchronization process (e.g., to synchronize the slave device with the master device) when the timeout monitor detects a timeout associated with a pulse detected in the clock signal. Accordingly, during a data communication transmission, a period of the clock signal may be configured to remain within a certain interval. Accordingly, a timeout threshold may be configured and/or determined based on an upper limit, $T_{max}$, for the period of the clock signal. In some implementations, the timeout threshold is a predetermined and/or preconfigured duration (e.g., according to a design, manufacture, and/or the like). The timeout monitor may reset the slave shift register (e.g., an interface block of the interface of the slave device) whenever a timing between two clock signals is longer than the timeout threshold, $T_{out}$. For example, a value for the timeout threshold may correspond to $T_{max}$ plus a certain margin $\Delta t$, such that $T_{out}=T_{max}+\Delta t$.

In this way, the timeout monitor may be configured to detect whether a timeout has occurred between pulses of a clock signal.

As shown in FIG. 1B, and by reference number 110, the slave device receives a clock signal from the master device. As described herein, the clock outputs a clock signal for timing the communication of data between the master device and the slave device. The communication of data may involve communicating bits between the master shift register and/or the slave shift register. For example, data transmitted from the master device to the slave device may include, with each pulse of the clock signal, shifting a bit from the master shift register, through the bus, and into the slave shift register (when the slave device detects the pulse in the clock signal). On the other hand, data transmitted from the slave device to the master device may include, with each pulse of the clock signal, shifting a bit from the slave shift register, through the bus, and into the master shift register.

Accordingly, to transmit a data communication (e.g., a word, a dataset, and/or the like) with n bits, the clock signal my include n pulses to transmit the data communication. The data communication may correspond to a control message (e.g., which may be sent from the master device to the slave device to trigger a sensor element of the slave device to capture a measurement), a measurement (e.g., which may be sent from the slave device to the master device), and/or the like. In example implementation 100, the master shift register and the slave shift register are shift registers with a same length n that permit both the master shift register and the slave shift register to store up to n bits. In some implementations, the master shift register and/or the slave shift register may have shift registers with different lengths.

In this way, the slave device may receive a clock signal to permit the slave device to monitor the clock signal for a timeout associated with a detected pulse of the clock signal.

As further shown in FIG. 1B, and by reference number 120, the timeout monitor detects pulses of the clock signal and/or timeouts associated with the pulses. For example, for each clock pulse detected by the timeout monitor, the timeout monitor may trigger an RMM that is configured to clear the shift register after a fixed time (e.g., which may correspond to the timeout threshold $T_{out}$). Additionally, or alternatively, the timeout monitor may use a counter and an internal clock (or timer), and/or the like. For example, after each pulse the timeout monitor may trigger the RMM and/or start the counter and increment the counter according to the internal clock and if the counter reaches a value corresponding to the timeout, before the timeout is detected, the timeout monitor may detect a timeout associated with the clock signal. Accordingly, if another pulse is detected before a timeout threshold, the timeout monitor may retrigger the RMM and/or reset the counter and track the amount of time that passes from that pulse. However, if the amount of time that passes from that pulse reaches (or satisfies) the timeout threshold, the timeout monitor may determine that a timeout associated with the clock signal has occurred.

Accordingly, as described herein, the timeout monitor may include or be implemented via an RMM (e.g., an asynchronous RMM), with a time parameter set to $T_{out}$, and/or a counter that utilizes an internal clock.

In example implementation 100, the interface of the slave device is clocked by the clock signal received via the clock line. Upon detecting a pulse in the clock signal (and/or another type of similar clock event), the timeout monitor may be triggered (e.g., to start monitoring the clock signal for another pulse) and a bit is shifted into the slave shift register of the slave device. In some implementations, the timeout may be triggered based on a notification and/or message from the interface. After each clock event that occurs within $T_{out}$, the timeout monitor is retriggered, and another bit is shifted into the slave shift register. When the shift register is full, the timeout monitor may be disabled and the data or value in the slave shift register can be interpreted by the slave device (e.g., a certain command is executed, the data is written to an internal data structure or memory, and/or the like). In some implementations, when the shift register is full, a dataset (e.g., a word) of the data communication has been fully transmitted and received and subsequent data communications can be immediately transmitted (e.g., without the need to reset the slave shift register).

Accordingly, the timeout monitor may determine whether a timeout threshold expires before another pulse of the clock signal is detected or whether another pulse of the clock signal is detected before the timeout threshold expires. When another pulse of the clock signal is detected before the timeout threshold expires, the slave device may shift the bit from the bus into the slave shift register, as the slave device may consider the clock signal to be under normal or standard operation. However, when the timeout threshold expires before another pulse of the clock signal is detected, the slave device timeout monitor may indicate that a timeout has occurred, indicating that an error associated with the clock signal has occurred (or likely occurred), and thus, that the slave device is not synchronized with the master device.

In this way, the slave device, via the timeout monitor, may detect a timeout relative to a detected pulse of the clock signal, to permit the slave device to self-trigger a resynchronization process to resynchronize the slave device with the master device.

As further shown in FIG. 1B, and by reference number 130, if the timeout monitor detects a timeout from a pulse of the clock signal, the timeout monitor resets the slave shift register. For example, if the timeout monitor detects a timing between two pulses (or a timing after one pulse) that is longer than or equal to the timeout threshold, $T_{out}$, the timeout monitor may reset the slave shift register. In some implementations, to reset the slave shift register, the timeout monitor may cause the interface to clear any or all bits from the slave shift register. With the slave shift register reset, the slave device is resynchronized with the master device and capable of receiving subsequent data communications. Thus, whenever the master device and the slave device are unsynchronized (or out-of-sync), the master device may wait for the timeout threshold $T_{out}$ to expire before starting a new transmission (which has already passed and was detected by the timeout monitor of the slave device). In this way, the master device and/or slave device may consume relatively little to no amount of time resynchronizing when the master device and the slave device are unsynchronized.

In some implementations, one or more communication protocols for two-way communication can be implemented. For example, for a two-way communication protocol, a first word of one transmission frame may be written from the master device to the slave device. The first word may include a bit that indicates whether subsequent words are to be written to or read from the slave device. In some implementations, for a write to the slave device, a second word may include a register address, to which the master device is to write. In such a case, subsequent words may be written to the slave shift register, starting at that register address. In some implementations, for a read from the slave device, a second word may be transmitted from the master device to the slave device. The second word may include a register address, from which the master device is to read. In such a case, subsequent words may be read from the slave shift register, starting at that register address. Additionally, or alternatively, for a read from the slave device, subsequent words may be read from the slave shift register, starting at register address zero. In some implementations, to prevent output drivers from the master device and the slave device from driving against each other in the case of a faulty transmission, the output drivers may be configured as open drain and may use a pull-up resistor of the bus. In this way, cleared data from the slave shift register can be drained via the pull-up resister of the bus.

In this way, the slave device can be resynchronized with the master device when the slave device becomes unsynchronized from the master device (e.g., due to a faulty transmission, a glitch in the clock signal, interference, and/or the like).

As further shown in FIG. 1B, and by reference number 140, the slave device may be configured to indicate to the master device that the slave shift register has been reset. For example, the slave device may notify the master device using a flag (e.g., a status bit) that indicates, based on a value of the flag (e.g., a '0' or a '1'), that the slave device has been resynchronized with the master device. Accordingly, whenever the timeout monitor (e.g., via an RMM) resets the slave shift register, a dedicated flag (e.g., a clear upon read flag) may be set. In such cases, after the master device sends each data communication (e.g., after all bits of the data communication have been transmitted), the master device may wait for the timeout threshold $T_{out}$, and then read the value of the dedicated flag. For example, a value of '0' may indicate that no resynchronization occurred and a value of '1' may indicate that a resynchronization was performed by the slave device, and/or, correspondingly, that a data communication may have failed. In this way, the master device may be notified that one or more actions are to be performed to address any potential failed data communications associated with the slave device performing a self-triggered resynchronization. Furthermore, the flag may be cleared after the master device reads to the flag to enable subsequent data communications to be received and properly verified.

In some implementations, the slave device may identify a word length for a data communication (e.g., a number of bits of the data communication). The word length may be preconfigured (e.g., based on the length of the shift register). In such cases, the slave device may determine that a number of bits in the shift register does not match the word length and send a notification (e.g., via a subsequent communication, via a flag, and/or the like) to the master device to reflect the same and/or indicate that an error occurred, likely occurred, or may have occurred. In some implementations, the master device may include a checksum in a data communication (e.g., a parity, a cyclic redundancy check (CRC), an MD5 sum, and/or the like). Accordingly, the slave device may use the checksum in association with previously received data communications and/or the value of the slave shift register to verify whether data associated with the previously received data communications and/or written from the slave shift register is/are valid. In this way, the slave device may notify the master device that an error occurred, likely occurred, and/or may have occurred. Additionally, or alternatively, the slave device, before the slave shift register is reset, may provide a value in the shift register to the master device. In such cases, the master device may use the value to determine whether an error associated with the clock signal occurred during a data communication. In this way, the master device may be notified that an error associated with slave device has occurred and/or likely has occurred. Furthermore, the master device may determine that an error associated with a data communication involving the slave device has occurred.

In some implementations, after a data communication, the master device may verify one or more data communications by reading the value of the slave shift register (e.g., after the timeout threshold, $T_{out}$, expires). For example, the master device may send a read command to the slave device to cause the slave device to load a previously processed data communication (which may or may not correspond to a transmitted or received data communication depending on whether an error occurred with the data communication) into the slave shift register and provide that data communication back to the master device. The data communications may correspond to one or more words (e.g., one or more most recently received data communications) of a plurality of words transmitted and/or received as data communications. In some implementations, the timeout monitor may prevent the interface from clearing the slave shift register until the timeout threshold, $T_{out}$, expires to permit the master device to read back the value of the slave shift register to verify that the value in the slave shift register matches the data communication.

Accordingly, as described herein, a slave device may be configured to perform a resynchronization process based on monitoring a clock signal for timeouts between pulses of the clock signal. As described herein, the resynchronization process may be self-triggered, and thus may not need to be initiated by a master device in communication with the slave device. Accordingly, as shown in example implementation 100, the timeout monitor of the slave device permits the slave device to be communicatively coupled with a master device via only a clock line and a bus for data transmission.

As indicated above, FIGS. 1A and 1B are provided merely as an example. Other examples may differ from what is described with regard to FIGS. 1A and 1B.

Figure 2:
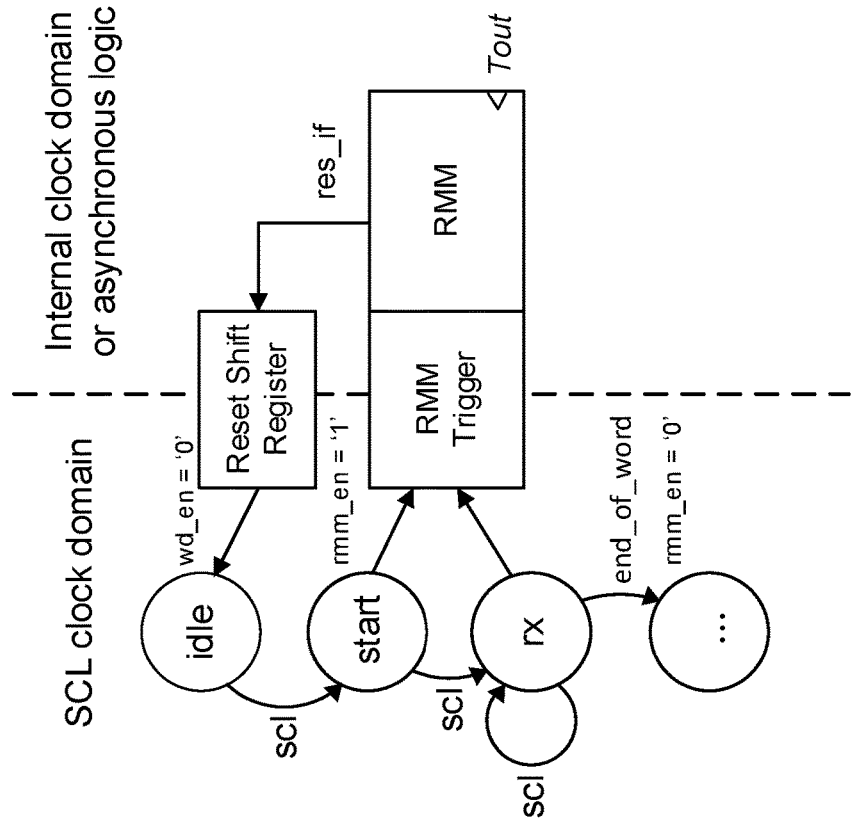

FIG. 2 is a diagram of an example implementation 200 described herein. Example implementation 200 illustrates an example state machine that may be used by the slave device of example implementation 100 to process data communications and/or detect a timeout associated with the clock signal. In example implementation 200, the shift register is clocked by a clock signal of a system clock line (SCL), which may correspond to the clock line of FIG. 1.

As shown by the state machine in FIG. 2, when a pulse is detected in an idle state (wd_en='0'), a data communication starts and an RMM trigger is enabled to activate the RMM (rmm_en='1'). For each subsequent receipt (rx) of a bit of the data communication by a corresponding SCL pulse, the RMM trigger reactivates (e.g., resets) the RMM (rmm_en='1'). If no other SCL pulse (e.g., clock cycle) is detected within the configured timeout threshold, $T_{out}$, the RMM resets the shift register (res_if). At the end of a word (end_of_word), the RMM gets disabled (rmm_en='0').

As indicated above, FIG. 2 is provided merely as an example. Other examples may differ from what is described with regard to FIG. 2.

Figure 3:
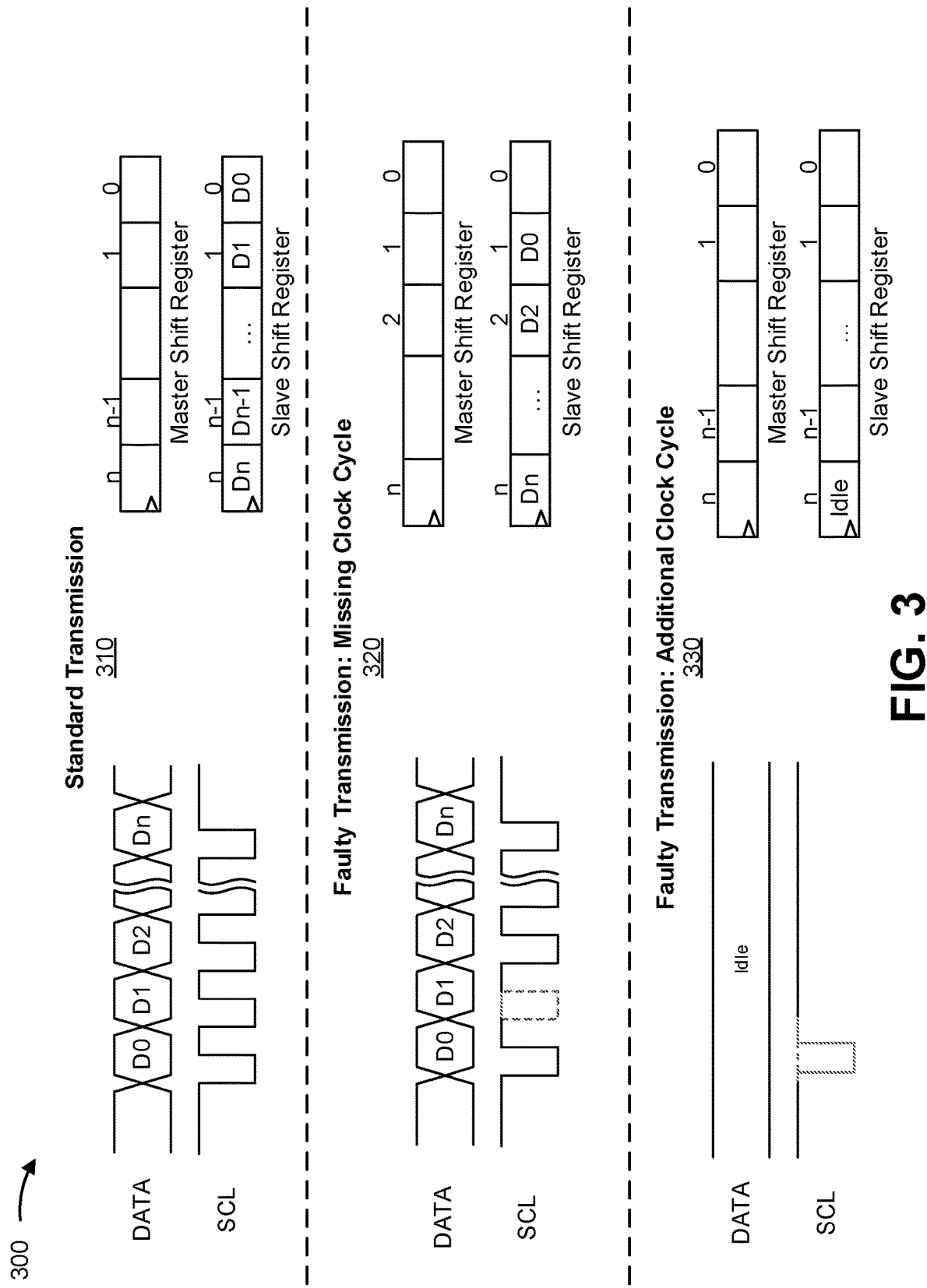

FIG. 3 is a diagram of an example implementation 300 described herein. Example implementation 300 includes example transmissions of data communications from a master device to a slave device (which may correspond to the master device and the slave device of FIG. 1) and corresponding clock signals that may be monitored by the slave device as described herein.

As shown in FIG. 3, and by reference number 310, a normal (or successful) transmission of data communication, of (n+1) bit length, from a master device to a slave device is shown. After transmission of the word, the master shift register of the master device is empty, and the slave shift register of the slave device is completely filled. Accordingly, both the master device and the slave device are in sync after the data communication is complete and a subsequent data communication can be transmitted.

As further shown in FIG. 3, and by reference number 320, a faulty transmission of a data communication, of (n+1) bit length, from the master device to the slave device may occur because the slave device may fail to properly interpret a clock cycle. Therefore, after the master device has shifted out the complete data communication, the slave device may still be waiting for one more bit. Accordingly, the master device and the slave device become unsynchronized. Further, if subsequent data communications are transmitted, the master device and the slave device would remain unsynchronized because bits from the subsequent data communication would be combined with the bits currently in the slave shift register. However, as described herein, after a timeout threshold, $T_{out}$, expires after the end of the transmission of the data communication, the timeout monitor of the slave device may reset the slave shift register to resynchronize the slave device and the master device.

As further shown in FIG. 3, and by reference number 330, a faulty transmission may be caused due to a glitch on the clock line. For example, the slave device may interpret the glitch as a pulse and loads a first data bit into the slave shift register (which may be equal to the bus idle state). Accordingly, the master device and the slave device become unsynchronized. After a timeout threshold, $T_{out}$, from the detected glitch, the timeout monitor of the slave device may reset the slave shift register to resynchronize the slave device and the master device.

As indicated above, FIG. 3 is provided merely as an example. Other examples may differ from what is described with regard to FIG. 3.

Figure 4:
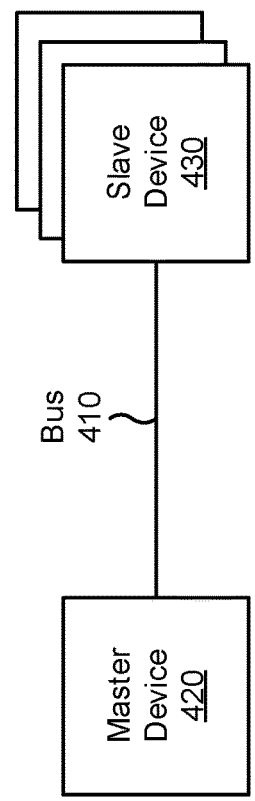
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a bus 410, a master device 420, and one or more slave devices 430 (referred to herein individually as "slave device 430," and collectively as "slave devices 430").

Bus 410 is any suitable bus configured for master-slave communication between master device 420 and slave device 430. In some implementations, bus may include a single wired connection (e.g., for unidirectional communication, for communication in one direction at a time, and/or the like). In some implementations, bus may include two or more wired connections (e.g., for communication in both directions between master device 420 and slave device 430, simultaneously). In such a case, a first wired connection may provide master-to-slave communication (e.g., from master device 420 to slave device 430) and a second wired connection may provide slave-to-master communication (e.g., from slave device 430 to master device 420).

Master device 420 includes one or more devices capable of serving as a master device with respect to a master-slave communication protocol, as described herein. For example, master device 420 may be any suitable device configured to control communication and/or clocking for devices in environment 400. Master device 420 is implemented in hardware, firmware, and/or a combination of hardware and software. In some implementations, master device 420 may include a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Master device 420 may include one or more processors capable of being programmed to perform a function (e.g., control slave devices 430).

Slave device 430 includes one or more devices capable of serving as a slave device with respect to a master-slave communication protocol. For example, slave device 430 may include a sensor (e.g., a magnetic sensor, a temperature sensor, a pressure sensor, a microphone, a light sensor, and/or the like), a peripheral (e.g., an input component, an output component, and/or the like) of a system, and/or the like. As described herein, slave device 430 may be a device capable of communicating via an SPI communication protocol.

According to some implementations, master device 420 and slave device 430 may be a same type of device (e.g., be a same make, manufacture, model, and/or the like). In such cases, master device 420 and slave device 430 may exchange one or more data communications to establish master device 420 as the master and slave device 430 as the slave for master-slave data communications via bus 410.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
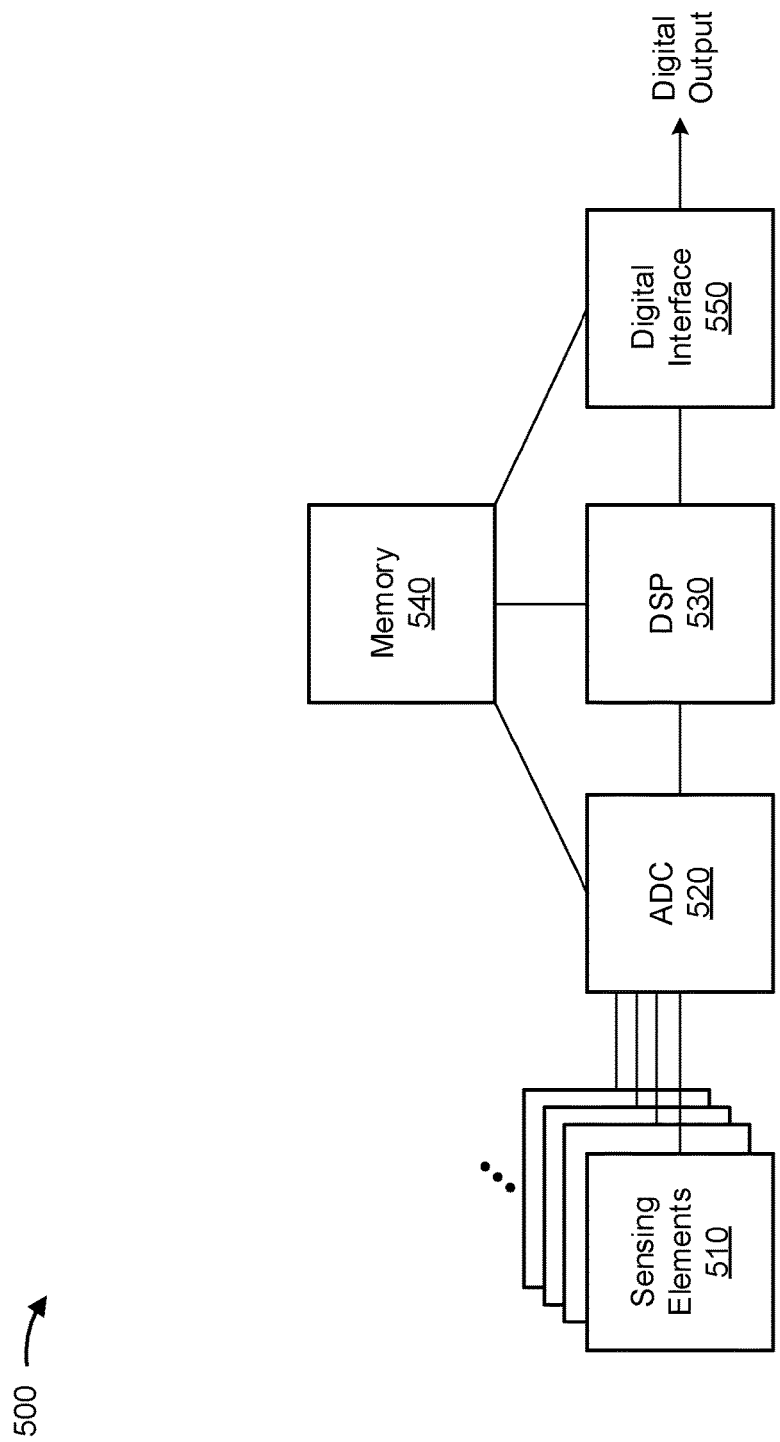
FIG. 5 is a diagram of example components of one or more devices of FIG. 4.

FIG. 5 is a diagram of example components of a device 500. Device 500 may correspond to one or more of slave devices 430 of FIG. 4. As shown, device 500 may include a set of sensing elements 510 (which may be referred to herein individually as "sensing element 510" or collectively as "sensing elements 510"), an analog-to-digital convertor (ADC) 520, a digital signal processor (DSP) 530, a memory 540, and a digital interface 550.

Sensing element 510 includes an element for sensing a component or set of components of a magnetic field present at device 500. For example, sensing element 510 may include a Hall-based sensing element that operates based on a Hall-effect. As another example, sensing element 510 may include a magnetoresistive based (MR-based) sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 510 may operate based on an anisotropic magnetoresistance (AMR) effect, a giant magnetoresistance (GMR) effect, a tunnel magnetoresistance (TMR) effect, and/or the like. As an additional example, sensing element 510 may include a variable reluctance (VR) based sensing element that operates based on induction. In some implementations, device 500 may include a differential sensor with multiple sensing elements 510. For example, device 500 may include a first sensing element 510 that operates to sense a first set of components of the magnetic field at the first sensing element, and a second sensing element 510 that operates to sense a second set of components of the magnetic field at the second sensing element. In this case, device 500 may compute the difference between the sets of components of the magnetic field to determine the position of a magnet (and/or an actuator or valve connected to the magnet).

ADC 520 may include an analog-to-digital converter that converts an analog signal from the set of sensing elements 510 to a digital signal. For example, ADC 520 may convert analog signals, received from the set of sensing elements 510, into digital signals to be processed by DSP 530. ADC 520 may provide the digital signals to DSP 530. In some implementations, device 500 may include one or more ADCs 520.

DSP 530 may include a digital signal processing device or a collection of digital signal processing devices. In some implementations, DSP 530 may receive digital signals from ADC 520 and may process the digital signals to form output signals, such as output signals associated with bits or a value in a shift register. DSP 530 may include a timeout monitor (e.g., the timeout monitor of example implementation 100). For example, DSP 530 may include an RMM, a counter, an internal clock, and/or the like to permit DSP 530 to monitor a clock signal and/or detect a timeout associated with the clock signal, as described herein.

Memory 540 may include a read only memory (ROM) (e.g., an electrically erasable programmable read-only memory (EEPROM)), a random-access memory (RAM), and/or another type of dynamic or static storage device (e.g., a flash memory, a magnetic memory, an optical memory, etc.) that stores information and/or instructions for use by device 500. In some implementations, memory 540 may store information associated with processing performed by DSP 530. Additionally, or alternatively, memory 540 may store configurational values or parameters for the set of sensing elements 510 and/or information for one or more other elements of device 500, such as ADC 520 or digital interface 550.

Digital interface 550 may include an interface via which device 500 may receive and/or provide information from and/or to another device, such as master device 420 of FIG. 4. For example, digital interface 550 may provide the output signal, determined by DSP 530, to master device 420 and/or may receive information from master device 420. In some implementations, digital interface may include a register, such as a shift register, as described herein.

The number and arrangement of elements shown in FIG. 5 are provided as an example. In practice, device 500 may include additional elements, fewer elements, different elements, or differently arranged elements than those shown in FIG. 5. Additionally, or alternatively, a set of elements (e.g., one or more elements) of device 500 may perform one or more functions described as being performed by another set of elements of device 500.

Figure 6:
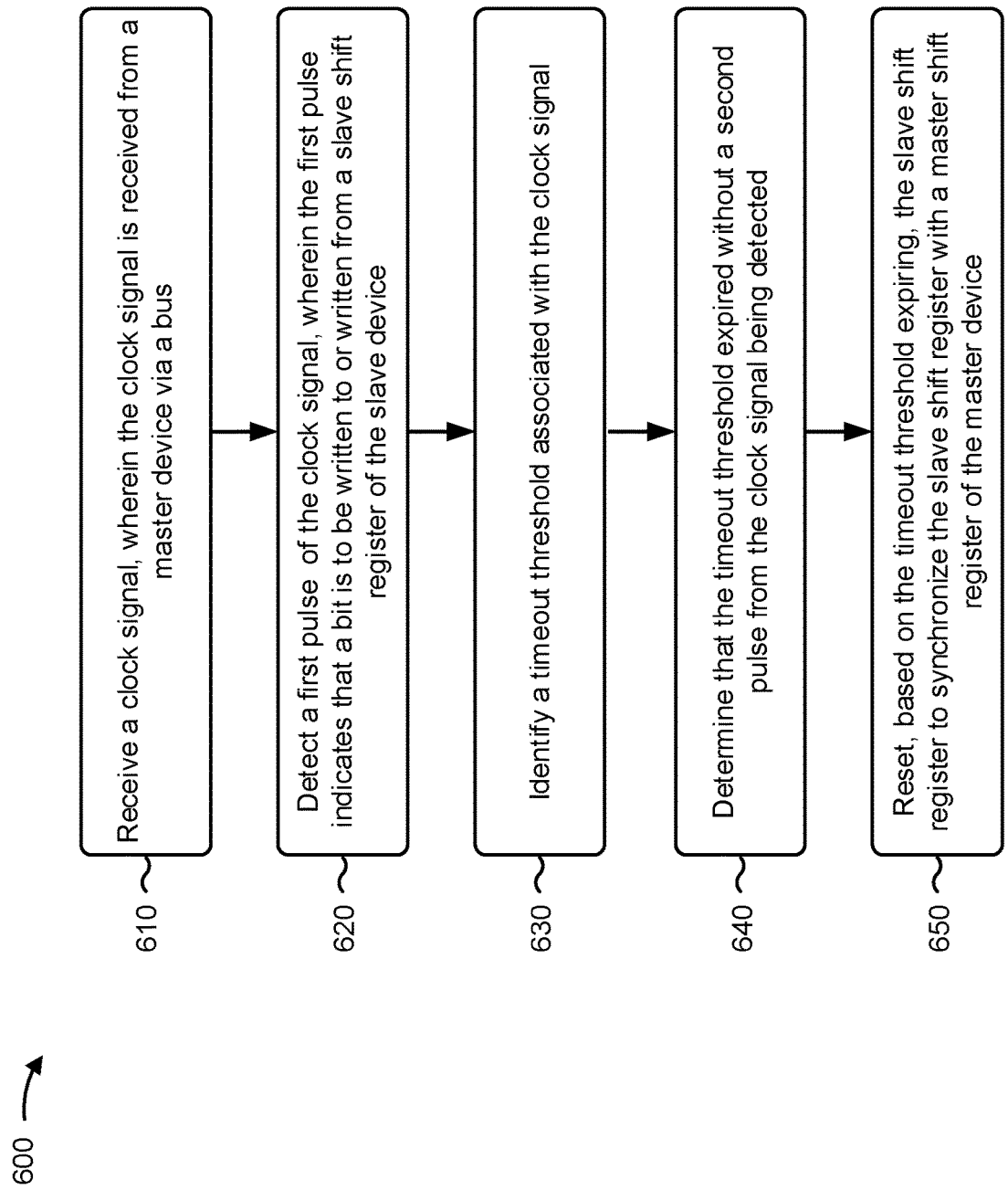

FIG. 6 is a flow chart of an example process 600 associated with a clock signal monitor for a slave device on a master-slave communication bus. In some implementations, one or more process blocks of FIG. 6 may be performed by a slave device (e.g., slave device 430). In some implementations, one or more process blocks of FIG. 6 may be performed by another device or a group of devices separate from or including the slave device, such as a master device (e.g., master device 420), and/or the like.

As shown in FIG. 6, process 600 may include receiving a clock signal, wherein the clock signal is received from a master device via a bus (block 610). For example, the slave device (e.g., using a slave shift register, timeout monitor, DSP 530, memory 540, digital interface 550, and/or the like) may receive a clock signal, as described above. In some implementations, the clock signal is received from a master device via a bus.

As further shown in FIG. 6, process 600 may include detecting a first pulse of the clock signal, wherein the first pulse indicates that a bit is to be written to or written from a slave shift register of the slave device (block 620). For example, the slave device (e.g., using a slave shift register, timeout monitor, DSP 530, memory 540, digital interface 550, and/or the like) may detect first pulse of the clock signal, as described above. In some implementations, the first pulse indicates that a bit is to be written to a slave shift register of the slave device.

As further shown in FIG. 6, process 600 may include identifying a timeout threshold associated with the clock signal (block 630). For example, the slave device (e.g., using a slave shift register, timeout monitor, DSP 530, memory 540, digital interface 550, and/or the like) may identify a timeout threshold associated with the clock signal, as described above.

As further shown in FIG. 6, process 600 may include determining that the timeout threshold expired without a second pulse from the clock signal being detected (block 640). For example, the slave device (e.g., using a slave shift register, timeout monitor, DSP 530, memory 540, digital interface 550, and/or the like) may determine that the timeout threshold expired without a second pulse from the clock signal being detected, as described above.

As further shown in FIG. 6, process 600 may include resetting, based on the timeout threshold expiring, the slave shift register to synchronize the slave shift register with a master shift register of the master device (block 650). For example, the slave device (e.g., using a slave shift register, timeout monitor, DSP 530, memory 540, digital interface 550, and/or the like) may reset, based on the timeout threshold expiring, the slave shift register to synchronize the slave shift register with a master shift register of the master device, as described above.

Process 600 may include additional implementations, such as any single implementation or any combination of implementations described below and/or in connection with one or more other processes described elsewhere herein.

In a first implementation, a duration of the timeout threshold is preconfigured based on a period of the clock signal. In a second implementation, alone or in combination with the first implementation, the slave device, when resetting the slave shift register, may include clearing all entries from the slave shift register.

In a third implementation, alone or in combination with one or more of the first and second implementations, the slave device may identify a word length associated with a data communication on the bus, determine, based on the timeout threshold expiring, that a number of bits in the slave shift register does not match the word length, and send a notification to the master device that an error occurred based on determining that the number of bits in the slave shift register does not match the word length.

In a fourth implementation, alone or in combination with one or more of the first through third implementations, the slave device may enable, based on receiving a read command from the master device and before resetting the slave shift register, a bit value of the slave shift register to be read by the master device to permit the master device to detect an error associated with a data communication on the bus. In a fifth implementation, alone or in combination with the fourth implementation, the data communication comprises a most recently received word of a plurality of words communicated via the bus.

In a sixth implementation, alone or in combination with one or more of the first through fifth implementations, the slave device may set, based on resetting the slave shift register, a flag to indicate to the master device that the slave shift register has been reset. In a seventh implementation, alone or in combination with one or more of the first through sixth implementations, the slave device communicates with the master device via a serial peripheral interface (SPI) communication protocol. In an eighth implementation, alone or in combination with one or more of the first through seventh implementations, the slave shift register is reset using an RMM.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 associated with a clock signal monitor for a slave device on a master-slave communication bus. In some implementations, one or more process blocks of FIG. 7 may be performed by a slave device (e.g., slave device 430). In some implementations, one or more process blocks of FIG. 7 may be performed by another device or a group of devices separate from or including the slave device, such as a master device (e.g., master device 420), and/or the like.

As shown in FIG. 7, process 700 may include monitoring a clock signal associated with a bus, wherein the clock signal is used to store, in the shift register, bits of a data communication, and wherein the data communication is received, via the bus, from a master device (block 710). For example, the slave device (e.g., using a slave shift register, timeout monitor, DSP 530, memory 540, digital interface 550, and/or the like) may monitor a clock signal associated with a bus, as described above. In some implementations, the clock signal is used to store, in the shift register, bits of a data communication. In some implementations, the data communication is received, via the bus, from a master device.

As further shown in FIG. 7, process 700 may include detecting a first pulse of the clock signal (block 720). For example, the slave device (e.g., using a slave shift register, timeout monitor, DSP 530, memory 540, digital interface 550, and/or the like) may detect a first pulse of the clock signal, as described above.

As further shown in FIG. 7, process 700 may include determining whether a timeout threshold expires before a second pulse is detected or whether a second pulse is detected before the timeout threshold is determined to be expired (block 730). For example, the slave device (e.g., using a slave shift register, timeout monitor, DSP 530, memory 540, digital interface 550, and/or the like) may determine whether a timeout threshold expires before a second pulse is detected or whether a second pulse is detected before the timeout threshold is determined to be expired, as described above.

As further shown in FIG. 7, process 700 may include, when the second pulse is detected before the timeout threshold is determined to be expired, resetting a timeout timer associated with the clock signal (block 740). For example, the slave device (e.g., using a slave shift register, timeout monitor, DSP 530, memory 540, digital interface 550, and/or the like) may, when the second pulse is detected before the timeout threshold is determined to be expired, reset a timeout timer associated with the clock signal, as described above.

As further shown in FIG. 7, process 700 may include, when the timeout threshold expires before a second pulse is detected, resetting the shift register to synchronize the shift register with a master shift register of the master device (block 750). For example, the slave device (e.g., using a slave shift register, timeout monitor, DSP 530, memory 540, digital interface 550, and/or the like) may, when the timeout threshold expires before a second pulse is detected, reset the shift register to synchronize the shift register with a master shift register of the master device, as described above.

Process 700 may include additional implementations, such as any single implementation or any combination of implementations described below and/or in connection with one or more other processes described elsewhere herein.

In a first implementation, when the second pulse is detected before the timeout threshold is determined to be expired, the slave device may determine whether the timeout threshold expires before a third pulse is detected or whether a third pulse is detected before the timeout threshold is determined to be expired; and when the third pulse is detected before the timeout threshold is determined to be expired, the slave device may reset the timeout timer associated with the clock signal, or when the timeout threshold expires before a third pulse is detected, the slave device may reset the shift register to synchronize the shift register with the master shift register of the master device.

In a second implementation, alone or in combination with the first implementation, when the second pulse is detected before the timeout threshold is determined to be expired, the slave device may determine that the second pulse is associated with a last bit of the data communication based on the shift register being full; write, to a data structure, a value associated with the shift register; and reset the shift register.

In a third implementation, alone or in combination with one or more of the first and second implementations, when the timeout threshold expires before a second pulse is detected and before the shift register is reset, the timeout monitor may at least one of: send, to the master device and based on a number of bits in the shift register not matching a word length for the data communication, a notification to indicate an error associated with the clock signal; provide a value in the shift register to the master device, wherein the value indicates that an error associated with the clock signal may have occurred when receiving the data communication; or set a flag to indicate, to the master device, that the shift register has been reset.

In a fourth implementation, alone or in combination with one or more of the first through third implementations, the slave device may include a sensor element, and the bits of the data communication are to cause the device to perform an action in association with the sensor element. In a fifth implementation, alone or in combination with one or more of the first through fourth implementations, the slave device may include a serial peripheral interface device without a dedicated chip select wire connection to synchronize the shift register with the master shift register.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 associated with a clock signal monitor for a slave device on a master-slave communication bus. In some implementations, one or more process blocks of FIG. 8 may be performed by a slave device (e.g., slave device 430). In some implementations, one or more process blocks of FIG. 8 may be performed by another device or a group of devices separate from or including the slave device, such as a master device (e.g., master device 420), and/or the like.

As shown in FIG. 8, process 800 may include monitoring a clock signal received from the master device via the bus, wherein the slave device is to store bits of the data communication in a slave shift register based on the clock signal (block 810). For example, the slave device (e.g., using a slave shift register, timeout monitor, DSP 530, memory 540, digital interface 550, and/or the like) may monitor a clock signal received from the master device via the bus, as described above. In some implementations, the slave device is to store bits of the data communication in a slave shift register based on the clock signal.

As further shown in FIG. 8, process 800 may include determining, based on a timing associated with a pulse of the clock, that a timeout threshold has expired, wherein the pulse of the clock signal comprises a most recently detected pulse of the clock signal (block 820). For example, the slave device (e.g., using a slave shift register, timeout monitor, DSP 530, memory 540, digital interface 550, and/or the like) may determine, based on a timing associated with a pulse of the clock, that a timeout threshold has expired, as described above. In some implementations, the pulse of the clock signal comprises a most recently detected pulse of the clock signal.

As further shown in FIG. 8, process 800 may include resetting the slave shift register to synchronize the slave shift register with a master shift register of the master device based on determining that the timeout threshold has expired (block 830). For example, the slave device (e.g., using a slave shift register, timeout monitor, DSP 530, memory 540, digital interface 550, and/or the like) may reset the slave shift register to synchronize the slave shift register with a master shift register of the master device based on determining that the timeout threshold has expired, as described above.

Process 800 may include additional implementations, such as any single implementation or any combination of implementations described below and/or in connection with one or more other processes described elsewhere herein.

In a first implementation, the most recently detected pulse comprises at least one of an erroneous pulse of the clock signal, or a pulse for a last bit of the data communication. In a second implementation, alone or in combination with the first implementation, the slave device may determine that the second pulse is associated with a last bit of the data communication based on the slave shift register being full, write, to a data structure and based on the slave shift register being full, a value associated with the slave shift register, and reset the slave shift register after the value is written to the data structure.

In a third implementation, alone or in combination with one or more of the first and second implementations, the master device and the slave device are communicatively coupled via only the bus and a clock line, wherein the bus is for the data communication and the clock line is for communication of the clock signal. In a fourth implementation, alone or in combination with one or more of the first through third implementations, the master device is a sensor device, or the slave device is a sensor device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a slave device, a clock signal,
        wherein the clock signal is received from a master device via a bus;
    detecting, by the slave device, a first clock pulse of the clock signal,
        wherein the first clock pulse indicates that a bit is to be written to or written from a slave shift register of the slave device;
    monitoring, by the slave device and based on detecting the first clock pulse, the clock signal for a second clock pulse;
    identifying, by the slave device, a timeout threshold associated with the clock signal,
        wherein the timeout threshold is a threshold length of time between two clock pulses;
    determining, by the slave device and based on monitoring the clock signal, that the timeout threshold expired before detecting the second clock pulse; and
    resetting, by the slave device and based on the timeout threshold expiring, the slave shift register to synchronize the slave shift register with a master shift register of the master device.

2. The method of claim 1, wherein a duration of the timeout threshold is preconfigured based on a period of the clock signal.

3. The method of claim 1, wherein resetting the slave shift register comprises:
    clearing all entries from the slave shift register.

4. The method of claim 1, further comprising:
    identifying a word length associated with a data communication on the bus;
    determining, based on the timeout threshold expiring, that a number of bits in the slave shift register does not match the word length; and
    sending a notification to the master device that an error occurred based on determining that the number of bits in the slave shift register does not match the word length.

5. The method of claim 1, further comprising:
    enabling, based on receiving a read command from the master device and before resetting the slave shift register, a bit value of the slave shift register to be read by the master device to permit the master device to detect an error associated with a data communication on the bus.

6. The method of claim 5, wherein the data communication comprises a most recently received word of a plurality of words communicated via the bus.

7. The method of claim 1, further comprising:
    setting, based on resetting the slave shift register, a flag to indicate to the master device that the slave shift register has been reset.

8. The method of claim 1, wherein the slave device communicates with the master device via a serial peripheral interface (SPI) communication protocol.

9. The method of claim 1, wherein the slave shift register is reset using a retriggerable monostable multivibrator.

10. A device, comprising:
a shift register; and
a timeout monitor, communicatively coupled to the shift register, configured to:
monitor a clock signal associated with a bus,
wherein the clock signal is used to store, in the shift register, bits of a data communication, and
wherein the data communication is received, via the bus, from a master device;
detect a first clock pulse of the clock signal;
monitor, based on detecting the first clock pulse, the clock signal for a second clock pulse;
determine, based on monitoring the clock signal, whether a timeout threshold expires before the second clock pulse is detected or whether the second clock pulse is detected before the timeout threshold is determined to be expired,
wherein the timeout threshold is a threshold length of time between two clock pulses; and
when the second clock pulse is detected before the timeout threshold is determined to be expired, reset a timeout timer associated with the clock signal, or
when the timeout threshold expires before the second clock pulse is detected, reset the shift register to synchronize the shift register with a master shift register of the master device.

11. The device of claim 10, wherein, after the timeout timer is reset based on the second clock pulse being detected before the timeout threshold is determined to be expired, the timeout monitor is further configured to:
determine whether the timeout threshold expires before a third clock pulse is detected or whether the third clock pulse is detected before the timeout threshold is determined to be expired; and
when the third clock pulse is detected before the timeout threshold is determined to be expired, reset the timeout timer associated with the clock signal, or
when the timeout threshold expires before the third clock pulse is detected, reset the shift register to synchronize the shift register with the master shift register of the master device.

12. The device of claim 10, wherein, when the second clock pulse is detected before the timeout threshold is determined to be expired, the timeout monitor is further configured to:
determine that the second clock pulse is associated with a last bit of the data communication based on the shift register being full;
write, to a data structure and based on the shift register being full, a value associated with the shift register; and
reset the shift register after the value is written to the data structure.

13. The device of claim 10, wherein, when the timeout threshold expires before the second clock pulse is detected and before the shift register is reset, the timeout monitor is configured to at least one of:
send, to the master device and based on a number of bits in the shift register not matching a word length for the data communication, a notification to indicate an error associated with the clock signal;
provide a value in the shift register to the master device, wherein the value indicates that the error associated with the clock signal may have occurred when receiving the data communication; or
set a flag to indicate, to the master device, that the shift register has been reset.

14. The device of claim 10, further comprising a sensor element,
wherein the bits of the data communication are to cause the device to perform an action in association with the sensor element.

15. The device of claim 10, wherein the device includes a serial peripheral interface device without a dedicated chip select wire connection to synchronize the shift register with the master shift register.

16. A system that includes a bus and a master device configured to transmit a data communication via the bus, the system comprising:
a slave device configured to:
monitor a clock signal received from the master device via the bus,
wherein the slave device is to store bits of the data communication in a slave shift register based on the clock signal;
detect a first clock pulse of the clock signal;
monitor, based on detecting the first clock pulse, the clock signal for a second clock pulse;
determine, based on monitoring the clock signal, that a timeout threshold has expired before detecting the second clock pulse,
wherein the timeout threshold is a threshold length of time between two clock pulses; and
reset the slave shift register to synchronize the slave shift register with a master shift register of the master device based on determining that the timeout threshold has expired.

17. The system of claim 16, wherein the first clock pulse comprises at least one of:
an erroneous clock pulse of the clock signal, or
a clock pulse for a last bit of the data communication.

18. The system of claim 16, wherein the slave device is further configured to:
determine that the first clock pulse is associated with a last bit of the data communication based on the slave shift register being full;
write, to a data structure and based on the slave shift register being full, a value associated with the slave shift register; and
reset the slave shift register after the value is written to the data structure.

19. The system of claim 16, wherein the master device and the slave device are communicatively coupled via only the bus and a clock line,
wherein the bus is for the data communication and the clock line is for communication of the clock signal.

20. The system of claim 16, wherein the master device is a sensor device or the slave device is a sensor device.

* * * * *